(12) United States Patent  (10) Patent No.: US 6,668,354 B1
Chen et al.  (45) Date of Patent: Dec. 23, 2003

(54) AUTOMATIC DISPLAY SCRIPT AND STYLE SHEET GENERATION

(75) Inventors: Shyh-Kwei Chen, Chappaqua, NY (US); Jen-Yao Chung, Yorktown Heights, NY (US); Mitchell A. Cohen, Yorktown Heights, NY (US); Shiwa S. Fu, Bedford Hills, NY (US); Vibby Gottemukkala, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,815

(22) Filed: Jan. 5, 1999

(51) Int. Cl.[7] ............................................... G06F 15/00
(52) U.S. Cl. ...................... 715/517; 715/513; 715/522; 715/530
(58) Field of Search ................................. 707/517, 522, 707/513, 530; 715/513, 517, 522, 530

(56) References Cited

U.S. PATENT DOCUMENTS

| | | | | |
|---|---|---|---|---|
| 5,450,538 A | * | 9/1995 | Glaser et al. ................ | 707/508 |
| 5,860,073 A | * | 1/1999 | Ferrel et al. ................ | 707/513 |
| 5,991,751 A | * | 11/1999 | Rivette et al. ................ | 707/1 |
| 6,009,436 A | * | 12/1999 | Motoyama et al. ........... | 706/59 |
| 6,023,714 A | * | 2/2000 | Hill et al. .................... | 707/513 |
| 6,125,391 A | * | 9/2000 | Meltzer et al. ............... | 370/466 |
| 6,199,068 B1 | * | 3/2001 | Carpenter .............. | 340/870.03 |
| 6,199,082 B1 | * | 3/2001 | Ferrel et al. ................. | 707/522 |
| 6,230,173 B1 | * | 5/2001 | Ferrel et al. ................. | 707/513 |
| 6,247,020 B1 | * | 6/2001 | Minard ........................ | 345/629 |
| 6,249,844 B1 | * | 6/2001 | Schloss et al. .............. | 707/513 |
| 6,263,352 B1 | * | 7/2001 | Cohen ......................... | 707/513 |
| 6,266,684 B1 | * | 7/2001 | Kraus et al. ................. | 345/800 |
| 6,279,015 B1 | * | 8/2001 | Fong et al. .................. | 707/523 |

OTHER PUBLICATIONS

Microsoft FrontPage 98, Sams.net Publishing, 1997, pp. 557–570.*

* cited by examiner

*Primary Examiner*—Sanjiv Shah
*Assistant Examiner*—Rachna Singh
(74) *Attorney, Agent, or Firm*—F. Chau & Associates, LLP (57) ABSTRACT

A system for automatically generating a style sheet includes a parser for generating a document type graph in accordance with an input structure, a graphical user interface tool for interactively mapping the document type graph to form a display template in accordance with user requirements and a script generator for generating and storing the style sheet in accordance with the graphical user interface and the design template.

9 Claims, 14 Drawing Sheets

```
<PurchaseOrder>
   <PONumber> 1200 </PONumber>    <Purpose> Original </Purpose>
   <Date> 980116</Date>            <Type> Stand-alone Order </Type>
   <LineItem>
      <ItemNO> 0001 </ItemNO>     <Quantity> 1 </Quantity>
      <Unit> Box </Unit>          <UnitPrice> 5.29 </UnitPrice>
      <ProductService>
         <ServiceID> 79845 </ServiceID>
         <ServiceDescription> Vendor (Sellers) Part Number </ServiceDescription>
      </ProductService>
      <ProductService>
         <ServiceID> 0 </ServiceID>
         <ServiceDescription> Purchase Item Code </ServiceDescription>
      </ProductService>
      <ProductDescription>        <Format> Free </Format>
         <Description> 01Bussiness Cards </Description>
      </ProductDescription>
      <ProductDescription>        <Format> Free </Format>
         <Description> 02Research Staff Member, Manager </Description>
      </ProductDescription>
      <Address>
         <Party> Ship To </Party> <Name> IBM TJ Watson Research Center </Name>
         <Street> PO Box 704 (Hawthorne) </Street> <City> Yorktown Heights </City>
         <State> NY </State> <ZipCode> 10598 </ZipCode>
      </Address>
   </LineItem>
   <LineItem>
      <ItemNO> 0002 </ItemNO>     <Quantity> 20 </Quantity>
      <Unit> Case </Unit>         <UnitPrice> 20.00 </UnitPrice>
   </LineItem>
   <Address>
      <Party> Bill-to-Party <Name> IBM Corporation </Name>
      <AdditionalName> Account Payable </AdditionalName>
      <Street> PO Box 9005 </Street> <City> Endicott </City>
      <State> NY </State> <ZipCode> 13761 </ZipCode>
   </Address>
   <Address>
      <Party> Selling Party </Party> <Name> Corporate Graphics </Name>
      <Street> One Stationery Pl. </Street> <City> Rexburg </City>
      <State> ID </State> <ZipCode> 83441 </ZipCode>
   </Address>
   <TotalAmount> 205.29 </TotalAmount>
</PurchaseOrder>
```

FIG. 1

```
<!DOCTYPE    PO [
<!ELEMENT  0  PurchaseOrder (PONumber Purpose Date Type LineItem* Address*
                             TotalAmount)>
<!ELEMENT  1  PONumber ( #PCDATA ) >
<!ELEMENT  2  Purpose ( #PCDATA ) >
<!ELEMENT  3  Date ( #PCDATA ) >
<!ELEMENT  4  Type ( #PCDATA ) >
<!ELEMENT  5  LineItem ( ItemNO Quantity Unit UnitPrice ProductService*
                         ProductDescription* Address*) >
<!ELEMENT  6  Address ( Party Name AdditionalName? Street Street2?
                        City State ZipCode ) >
<!ELEMENT  7  TotalAmount ( #PCDATA ) >
<!ELEMENT  8  ItemNO ( #PCDATA ) >
<!ELEMENT  9  Quantity ( #PCDATA ) >
<!ELEMENT 10  Unit ( #PCDATA ) >
<!ELEMENT 11  UnitPrice ( #PCDATA ) >
<!ELEMENT 12  ProductService ( ServiceID ServiceDescription ) >
<!ELEMENT 13  ProductDescription ( Format Description ) >
<!ELEMENT 14  Party ( #PCDATA ) >
<!ELEMENT 15  Name ( #PCDATA ) >
<!ELEMENT 16  AdditionalName ( #PCDATA ) >
<!ELEMENT 17  Street ( #PCDATA ) >
<!ELEMENT 18  Street2 ( #PCDATA ) >
<!ELEMENT 19  City ( #PCDATA ) >
<!ELEMENT 20  State ( #PCDATA ) >
<!ELEMENT 21  ZipCode ( #PCDATA ) >
<!ELEMENT 22  ServiceID ( #PCDATA ) >
<!ELEMENT 23  ServiceDescription ( #PCDATA ) >
<!ELEMENT 24  Format ( #PCDATA ) >
<!ELEMENT 25  Description ( #PCDATA ) >
] >
```

Sample Purchase Order

| P.O. Number: 1200 | Date: 980116 |
|---|---|
| Purpose: Original | Type: Stand-alone Order |

Item Summary

| PO Line Item # | Qty Ordered | Unit | Unit Price |
|---|---|---|---|
| *0001* | 1 | Box | $5.29 |
| *0002* | 10 | Case | $20.00 |

| Bill-to-Party | | Selling Party | |
|---|---|---|---|
| Name | IBM Corporation | Name | Corporate Graphics |
| Additional Name | Account Payable | Additional Name | |
| Address | PO Box 9005 | Address | One Stationery Pl. |
| Additional Address | | Additional Address | |
| City | Endicott | City | Rexburg |
| State | New York ▼ | State | Idaho ▼ |
| Postal Code | 13761 | Postal Code | 83441 |

Total Monetary Amount: $205.29

FIG. 4A

PO Line Item Detail

| Line Item No: 0001 | Quantity Ordered: 1 |
|---|---|
| Unit of Measure: Box | Unit Price: $5.29 |

| Product/Service ID | Product/Service ID Descriptor |
|---|---|
| 79845 | Vendor (Sellers) Part Number |
| 0 | Purchase Item Code |

Product Description  *450*

```
Ship To
IBM TJ Watson Research Center
PO Box 704 (Hawthorne)
Yorktown Heights, New York 10598
```
*460*

FIG. 4B

| Detailed Product Description ||
|---|---|
| Format | Description |
| Free | 01Business Cards |
| Free | 02Research Staff Member, Manager |
|  | ■ ■ ■ ■ ■ ■ ■ ■ |

| State | Abbreviation |
|---|---|
| Alabama | AL |
| Arizona | AZ |
| ---------- | ---------- |
| Idaho | ID |
| ---------- | ---------- |
| New York | NY |
| ---------- | ---------- |
| Wyoming | WY |

USStates

FIG. 6

`<layer>` ⓪  
⟵710  ⟵776  
705 `<text>[center]` Sample Purchase Order  707  770  
`<2x2 fixed table>`

| `<text>` P.O. Number: `<text>` ① | `<text>`Date: `<text>` ③ |
|---|---|
| `<text>` Purpose: `<text>` ② | `<text>`Type: `<text>` ④ |

720

`<text>[left]`  ⟵778  
Item Summary  `<4-column row-repeatible table>` ⑤  ⟵772

| `<text>[center]` PO Line Item # | `<text>[center]` Qty Ordered | `<text>[center]` Unit | `<text>[center]` Unit Price |
|---|---|---|---|
| `<row>[empty]` | | | |
| `<text>` `<Key for popup layer 2>` ⑧ | `<text>` ⑨ | `<text>` ⑩ | `<text>`$`<text>` ⑪ |

725  750  730  
715 `<variable-row 2-column repeatible table>[2 tables per row]` ⑥ (path)

| `<text>[bold][span 2 columns]` ⑭ (path) | |
|---|---|
| `<text>[left]` Name | `<input text field>` ⑮ (path) |
| `<text>[left]` Additional `<text>[left]` Name | `<input text field>` ⑯ (path) |
| `<text>[left]` Address | `<input text field>` ⑰ (path) |
| `<text>[left]` Additional `<text>[left]` Address | `<input text field>` ⑱ (path) |
| `<text>[left]` City | `<input text field>` ⑲ (path) |
| `<text>[left]` State | `<select box>` ⑳ (path) [using USStates table for name expansion] |
| `<text>[left]` Postal Code | `<input text field>` ㉑ (path) |

735  774  740

`<text>`  ⟵745  
Total Monetary Amount: $ `<text>[italic]` ⑦

<layer>[2] ⑤

<text>[left] PO Line Item Detail

<2x2 fixed table>

| <text>[left]<br>Line Item No: <text> ⑧ | <text>[left]<br>Quantity Ordered: <text> ⑨ |
|---|---|
| <text>[left]<br>Unit of Measure: <text> ⑩ | <text>[left]<br>Unit Price: $ <text> ⑪ |

<2-column row-repeatible table> ⑫

| <text>[center]<br>Product/Service ID | <text>[center] Product/Service<br><text>[center] ID Descriptor |
|---|---|
| <text>[center] ㉒ | <text>[center] ㉓ |

<text>[key for popup layer 3]

Product Description

/— 780

<1-column row-repeatible table>[with border lines, without internal lines] ⑥ (path)

<text>[left,bold] ⑭
<row>[empty]
<text>[left] ⑮
<text>[left,optional] ⑯
<text>[left] ⑰
<text>[left,optional] ⑱
<text>[left] ⑲ <text>, <text> ⑳ <text> ㉑

FIG. 7C

<layer>[3] ⑬
<2-column row-repeatible table>

| <text>[center,bold]<br>[span 2 columns] Detailed Product Description ||
|---|---|
| <text>[left,bold] Format | <text>[left,bold] Description |
| <text>[left] ㉔ | <text>[left] ㉕ |

```
print_6(n) {                          /—810
  document.write("<TABLE>");
  document.write("<TR><TD SPAN='2'>" + print_14(n) + "</TD></TR>");
  document.write("<TR><TD ALIGN='left'>Name </TD><TD>"+print_15(n)+"</TD><TR>");
  document.write("<TR><TD ALIGN='left'>Additional Name </TD><TD>"+print_16(n)+
            "</TD></TR>");
  document.write("<TR><TD ALIGN='left'>Address </TD><TD>"+print_17(n)+"</TD></TR>");
  document.write("<TR><TD ALIGN='left'>Additional Address </TD><TD>"+print_18(n)+
            "</TD></TR>");
  document.write("<TR><TD ALIGN='left'>City </TD><TD>"+print_19(n)+"</TD></TR>");
  document.write("<TR><TD ALIGN='left'>State </TD><TD>"+print_20(n)+"</TD></TR>");
  document.write("<TR><TD ALIGN='left'>Postal Code </TD><TD>"+print_21(n)+
            "</TD></TR>");
  document.write("<TABLE>");
}
      /—820
print_14(n) {
  forall (m=n.children) {       /—830
    if (m.tag=="PARTY") {
      // with hidden variable encoding layers that the component can be on,
      // if it can appear on other layers than the main layer,such as
      // "<INPUT TYPE='HIDDEN' NAME="+ m.tag + "ID="+createID(m) + "VALUE="+
      //           m.value+">";
      return "<INPUT TYPE='TEXT'NAME="+ m.tag + "ID="+createID(m) +
               "VALUE="+m.value+">";
    }
  }
}
        /—870
      /—840
print_20(n) {
  forall (m=n.children) {       /—850
    if (m.tag=="STATE") {                /—860
      return expand_for_select(m.value, USStates);
    }
  }
}
```

AUTOMATIC DISPLAY SCRIPT AND STYLE SHEET GENERATION

BACKGROUND OF THE INVENTION

1. Field of the Invention

The present invention relates to display script and style sheet generation and, more particularly, to a Graphical User Interface (GUI) tool for automating the generation of display script and style sheets.

2. Description of the Related Art

An extensible Markup Language document (XML) may be displayed to a browser using Javascript, style sheet languages such as extensible Stylesheet Language (XSL) and Cascading Style Sheet (CSS) or a combination thereof. The creation and maintenance of style sheets can be quite tedious and error prone, due to complicated style sheet language constructs. Furthermore, trading partners may need to create their own display style sheets for returning document generation in response to a previously received document, e.g., an invoice can be generated in response to a purchase order (PO), and a reply to request for quote (RFQ) in response to an RFQ etc.

Therefore, a need exists for a Graphical User Interface (GUI) tool for automating the generation of display script and style sheets. A further need exists for a system and method for creating documents and displays over the Internet which reduce potential human error, and allow trading partners to conduct on-line negotiations over display layouts.

SUMMARY OF THE INVENTION

A system for automatically generating a style sheet includes a parser for generating a document type graph in accordance with an input style or structure, a graphical user interface tool for interactively mapping the document type graph to form a display template in accordance with user requirements and a script generator for generating the style sheet in accordance with the graphical user interface and the design template.

In alternate embodiments, the input structure is preferably a data type definition (DTD) written in extensible markup and language (XML). The parser may be a data type definition parser and the document type graph may include a data type definition (DTD) graph. The document type graph preferably includes nodes representing data types. The nodes are capable of being manipulated such that the data type represented by the node is represented at a location to which the node is manipulated. The nodes are capable of having their properties altered by graphically activating the nodes of the graph. The system may further include abbreviation tables for converting abbreviations of the document type graph to full text to be displayed. The system may further include pop-up windows and layers provided by activating predetermined portions of the style sheet. The system may further include dynamic tables having dimensions which are determined upon rendering of the tables.

A program storage device readable by machine, tangibly embodying a program of instructions executable by the machine to perform method steps for automatically generating style sheets, the method steps include compiling an input structure to provide an arrangement of data types, manipulating the data types by a user to place the data types into a graphical layout for display and automatically generating a style sheet for interacting with users.

Another program storage device readable by machine, tangibly embodying a program of instructions executable by the machine to perform method steps for automatically generating style sheets, the method steps include compiling an input structure to provide an arrangement of data types in one of a node tree format and a table format, manipulating the data types by a user to drag and drop the data types into a graphical layout for display and automatically generating a style sheet for interacting with the user, the style sheet having a hierarchical architecture including at least one main layer having sub-layers and windows for providing additional information about components of the at least one main layer.

In other methods, the program storage device may further include the step of employing a single data type in multiple places in the style sheet. The program storage device may further include the step of assigning different tag names to the single data type for each place in the style sheet in which the type is used. The arrangement may include one of a table and a node tree. The program storage device may further include the step of providing full text expansion for data types entered by the user as abbreviations. The program storage device may further include the step of selecting rules for display styles such that the display of the style sheet is governed by properties selected. The program storage device may further include the step of applying code for components of the style sheet such that the display of the style sheet is governed in accordance to the code. The program storage device may further include the step of providing pop-up windows and layers which are invoked by a user. The program storage device may further include the step of passing variables between layers using hidden fields and labels. The program storage device may further include dynamic tables having dimensions which are determined upon rendering of the tables.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1 depicts a sample XML document encoding a purchase order for use with the present invention;

FIG. 8 is a style sheet that is generated for the display layout of FIG. 7A in accordance with the present invention;

DETAILED DESCRIPTION OF PREFERRED EMBODIMENTS

The present invention relates to display script and style sheet generation and, more particularly, to a Graphical User Interface (GUI) tool for automating the generation of display script and style sheets. For the present invention, an entire XML document may be treated as a Document Object Model (DOM) tree, ref. *Document Object Model (DOM) Level 1 Specification Version 1.0, W3C Proposed Recommendation*, Aug. 18, 1998, whose elements can be manipulated to fit into a Web page using Javascript and/or style sheet. A Graphical User Interface (GUI tool) is used to assist web page layout and table arrangement. Similar to a code generation phase in a modern compiler, partial script or a style sheet is generated corresponding to a specific layout selection. The invention includes style sheet generation by performing several tasks, for example: (1) utilize an existing parser for generating a Data Type Definition (DTD) graph, (2) prepare style sheet commands or code for a code generation process, to create individual components, to generate specific styles, and to invoke certain functions, (3) define customized abbreviation tables, and methods to access well-known pre-defined abbreviation tables, (4) specify allowable rules for component creation procedures/restrictions and displacement/outlook/format design and (5) arrange a GUI tool for examining/manipulating the DTD graph, enforcing the allowable rules, and invoking the code generation process to produce the style sheets.

A DTD parser is to generate and display a graph, which is useful to the GUI tool for providing user-friendly features such as drag-and-dropping a node of the DTD graph to a table entry, and double-clicking on a node for selecting options. Common components and display styles may be treated as objects and properties. Style sheet commands to achieve specific display effects, to invoke certain mathematics functions, and to establish relations between components (e.g., for passing parameters between layers) may be coded separately in advance under different style sheet scripts. The XML documents may include abbreviations for certain data elements (e.g., in US states, "NY" stands for "New York"). Allowing the usage of abbreviation tables can save the document size considerably, providing that such tables are common and easily accessible.

Efficient style sheet commands implementing binary search for table matching and data expansion may improve the display speed when XML documents are rendered to browsers using the style sheets. Simple rules governing the precedence relations or ordering among components may be enforced to ensure logical user-friendly operation sequences, and to perform basic syntax/semantics checking. For example, a style sheet designer can issue an "add one row" command only when a specific container (a table in this case) exists. Also when creating a new layer for grouping/hiding certain data elements, only syntactically/semantically related elements may be assigned to the same layer.

The basic rules for style sheet design include the following steps: (a) container creation (layouts, tables, rows etc.), (b) component assignment (using drag-and-drop, option selection, or text input), (c) container layout and displacement for layers, frames, tables, texts and data elements (types), (d) component display properties (fonts, text/input fields, select options etc.). The above steps can be repeatedly applied to create a nested container hierarchy such as a table inside a layer, a row in a table, an entry in a row, a text field and a drag-and-drop data element in an entry.

The GUI tool connects all the other tasks together, and bridges between the end users and the style sheets. By serving as a front-end, the tool provides many user-friendly features such as drag-and-drop, options listing, data field editing, and layer semantics checking. The tool also invokes an automatic code generation process so that the entire style sheet design/generation procedure and the style sheet itself can be transparent to the users.

For the present invention, Javascript and XSL components may be placed in a form to simplify their use in the automation process. The following page objects and display functions may be included.

A multi-layered design using pop up windows or frames has been included to provide (1) how to invoke a new layer or frame, and(2) what data types should be included in specific layer or frame. Tag expansion/mapping from a server site abbreviation table repository is provided to perform (1) binary search functions on large tables, (2) linear search functions for small tables with no more than 4 entries, and (3) given an XML field value, replacement with the XML field value's full description from the abbreviation table repository, using either binary search or linear search. Document object manipulation is provided for(1) unique identification (ID) creation by recursion, using relative position in a document object model (DOM) tree, (2) object display properties, e.g., font size, font type, underline, and color.

Simple form types have been provided, such as,(1) simple text display, (2) associate current document object information, e.g., ID, tag name, value, layer/frame etc., by defining variables, and (3) tag expansion/mapping. Editable form types are provided, such as, (1) input field, blank or pre-filled with text, (2) select with options-initial selection from a default string, or using the XML field value, (3) radio buttons, (4) check boxes, etc. XML document reconstruction is also provided for (1) original documents, and (2) updated documents. Table formatting is included for (1) table tags generation, (2) table layout, e.g., one table per row, or multiple tables per row and (3) tables inside a table. DOM loop items manipulation is provided to (1) display one iteration of loop types in a separate table, (2) display one type of loop in a table, with each iteration occupying a separate row, (3) display only partial information for each loop iteration, where key fields with highlighted click options can pop up windows or frames for more detailed loop displaying. Calculations are included for (1) sum on column/row for some tags, and (2) math formulas on multiple columns/rows.

The previously described page objects and display functions may be employed with the present invention. Other page objects and display functions may be used in addition to or instead of those described.

The invention will now be described in detail by way of an illustrative example. The illustrative example is not limiting. Referring now to the drawings in which like numerals represent the same or similar elements and initially to FIG. 1, a sample XML document is depicted for encoding a Purchase Order (PO), where there are two items ordered, i.e., item Nos. 0001 and 0002. Each item includes information code which begins at line items (LineItem) 120 and (LineItem) 125, respectively. Line item 120 includes detailed product descriptions, service types, and ship to address, and the line item 125 includes only key information, such as price, quantity and unit. Other information is included, for example, address information 121 and a total amount of the purchase 123.

Figure 2:
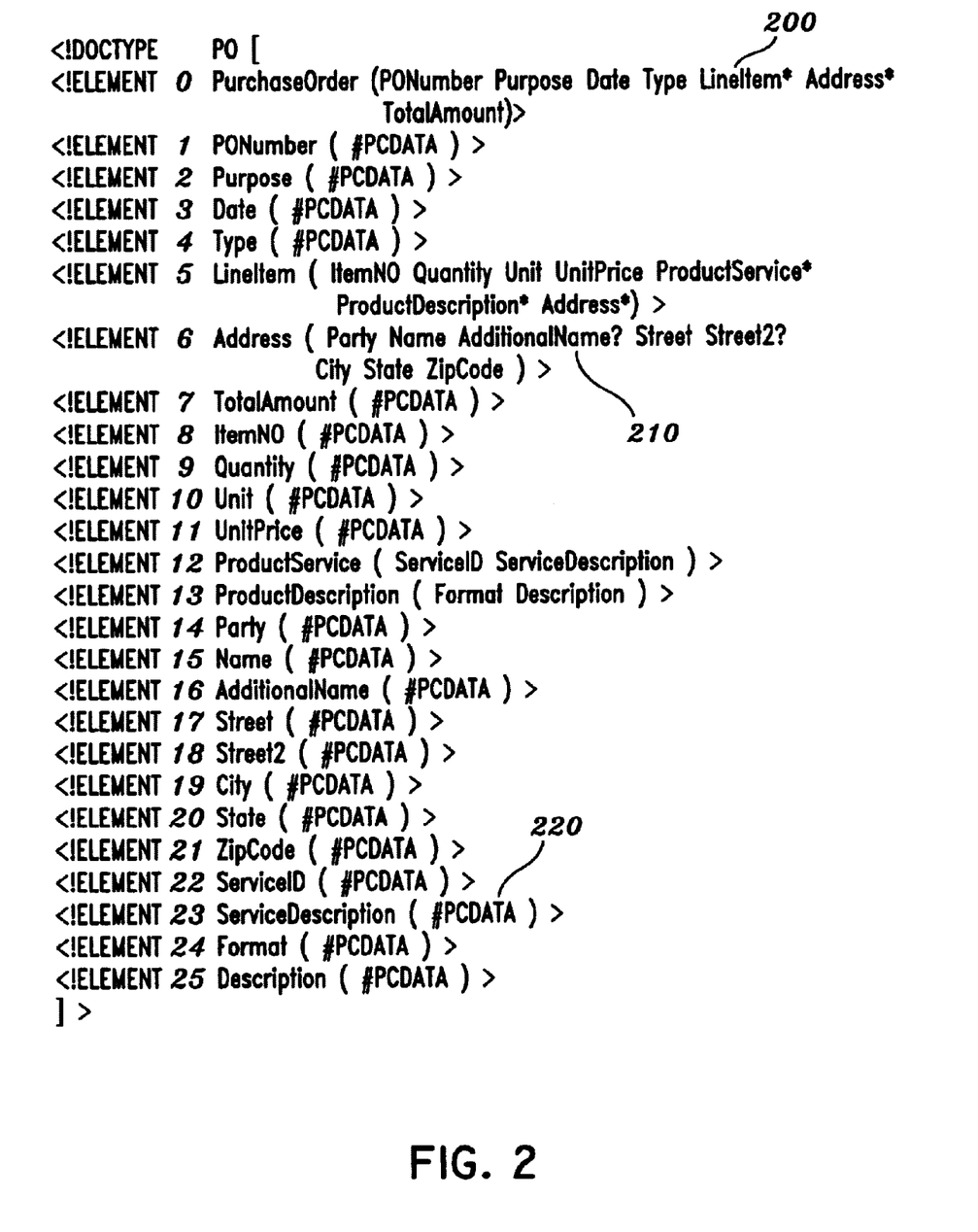
FIG. 2 is a data type definition (DTD) for the sample purchase order shown in FIG. 1 for use with the present invention.

Referring to FIG. 2, a Data Type Definition (DTD) for the sample PO of FIG. 1 is shown. DTD defines 26 data types (0–25). The Address data type 6 is referred by the data types Purchase Order 0 and LineItem 5, where LineItem itself is referred by PurchaseOrder 0 as indicated by the numeral 200. Repeatable data types are marked with a "*", e.g., the LineItem indicated by 200 referred by PurchaseOrder 0, and optional data types which can occur never or once are marked with a "?", e.g., AdditionalName indicated at numeral 210 referred by Address 6. The "#PCDATA" 220 represents parsed character data. The style sheet written in, for example, Javascript, XSL, or CSS provides a way to render any XML document (e.g., FIG. 1)with the same DTD (FIG. 2) to the browser.

The present invention provides an automatic style sheet design process by providing user-friendly features and automatic generation schemes. Based on the DTD (FIG. 2) this disclosure will describe automatic style sheet design process in accordance with the present invention.

Figure 3:
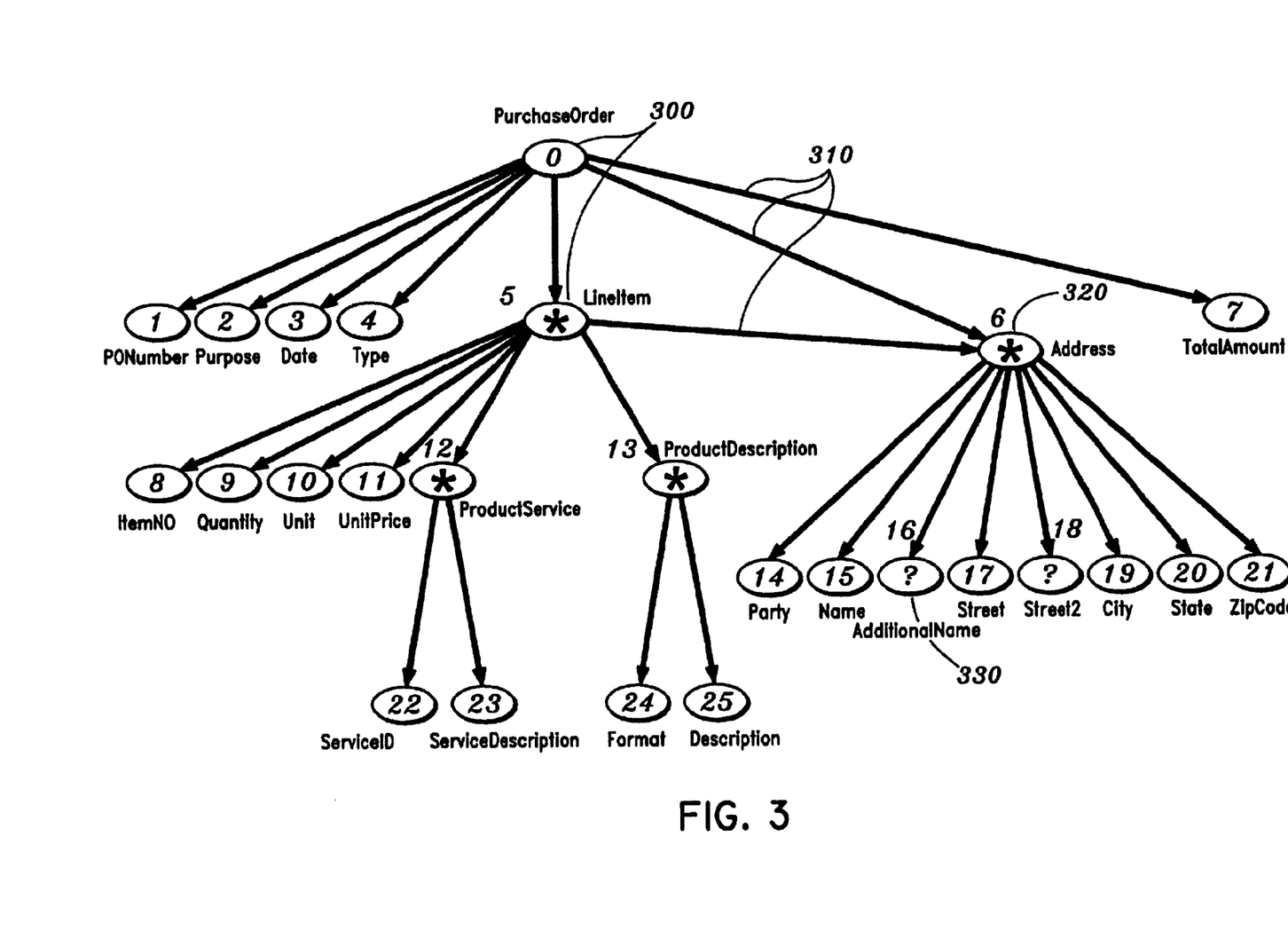
FIG. 3 is a graphical structure of the DTD of FIG. 2 in accordance with the present invention.

Referring now to FIG. 3, the DTD of FIG. 2 is depicted in a graphical structure. Oval-shaped nodes 300 represent data types. Each data type corresponds to the data types of the same number (or symbol) as indicated in FIG. 2. Arrows 310 from data types (for example, data type X, not shown) to another data type (for example data type Y, not shown) are drawn, if X referred Y during X's definition. A "*" within a node represents a repeatable data type, for example type 320, and a "?" within a node represents an optional data type 330, i.e., a data type which may not be needed for processing the PO, such as a second street address. The Address data type 6 has been referred twice, once by PurchaseOrder 0 and once by LineItem 5, respectively. The DTD graph of FIG. 3 is employed to simplify data processing in accordance with the invention. In this way, data types may be mapped and visited more efficiently.

Figure 4A:
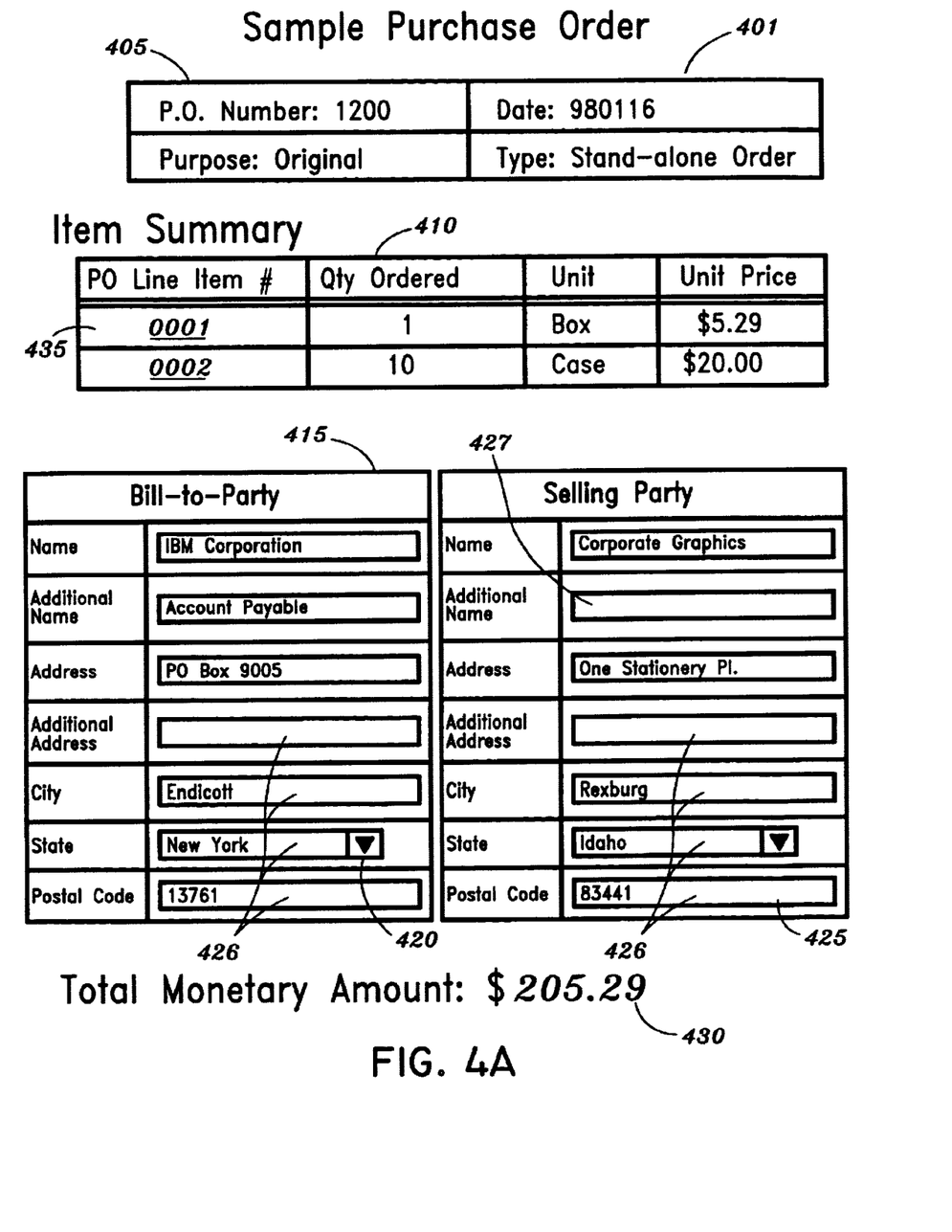
FIGS. 4A–4C show a main layer and two pop-up windows/layers, respectively for rendering the sample PO XML document of FIG. 1 in accordance with the present invention.
Figure 4B:
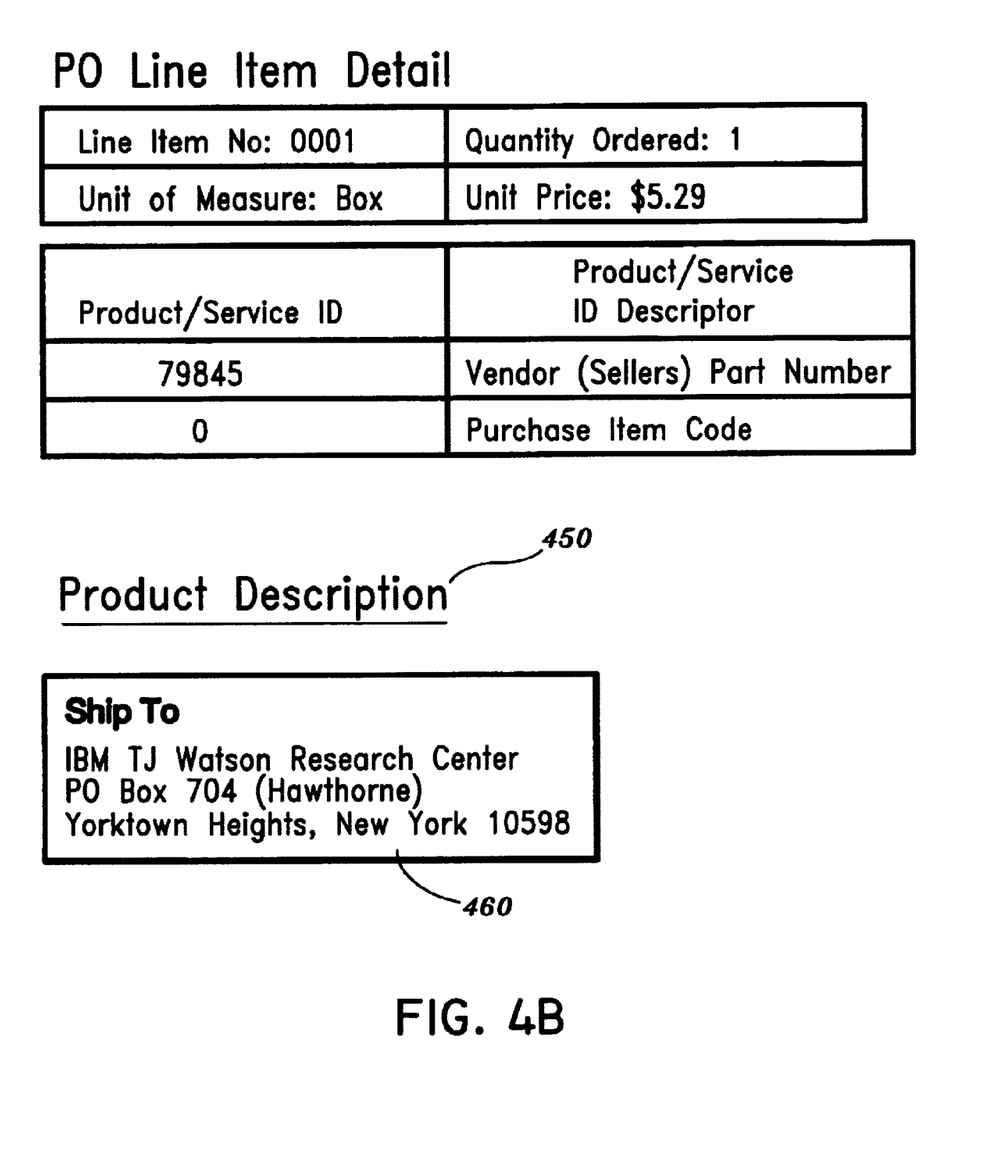
Figure 4C:
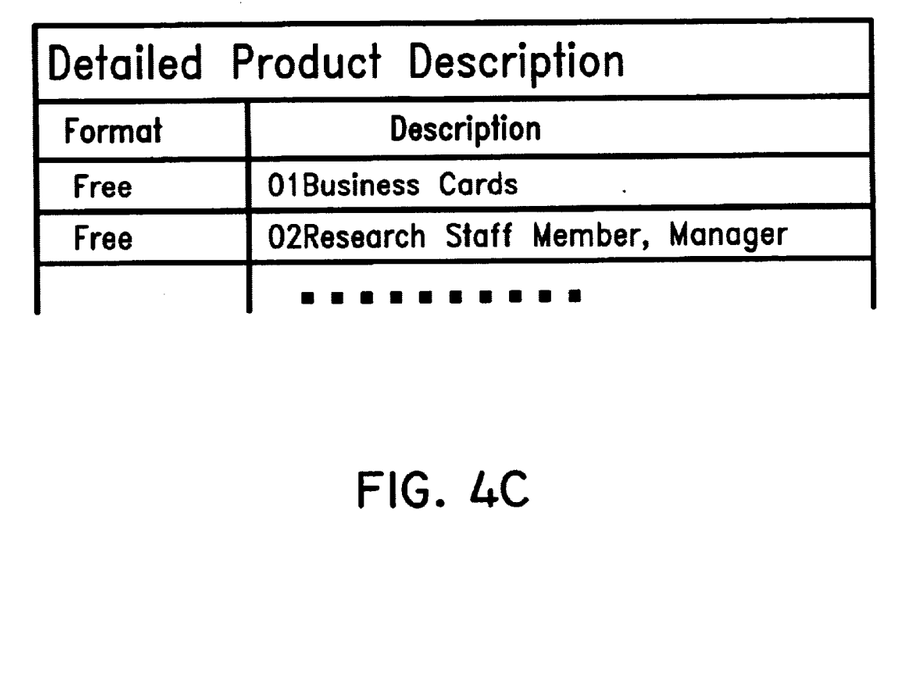

Referring to FIGS. 4A–4C, an illustrative screen (FIG. 4A) and two pop-up windows (FIGS. 4B and 4C) are shown for rendering the sample PO XML document shown in FIG. 1. FIG. 4A illustratively includes three different table styles. A 2×2 fixed table 405 shows the basic PO information including PO number, purpose, date, and type. The 4-column row repeatable table 410 lists a summary of the line items, where each row represents a different line item. A box 435 serves as a key to spawn a second layer (FIG. 43) which hides more detailed line item information. A 2-column table 415 displays the Address type 6 under PurchaseOrder 0, and there can be two tables side by side in a row. The table may include editable input text fields 426 with or without default values 425 and 427, respectively, or a select field 420 with a default option shown. Component properties can be altered using CSS, for example, in the displays, e.g., the TotalAmount element 430 has an italic font.

In addition to regular data types, the fixed text may be used to spawn a new layer. For example, the text "Product Description" 450 in FIG. 4B is used to pop up the third window (FIG. 4C) to hide extra information such as information in accordance with ProductDescription 13 of FIG. 2 as shown in FIG. 4C.

Figure 6:
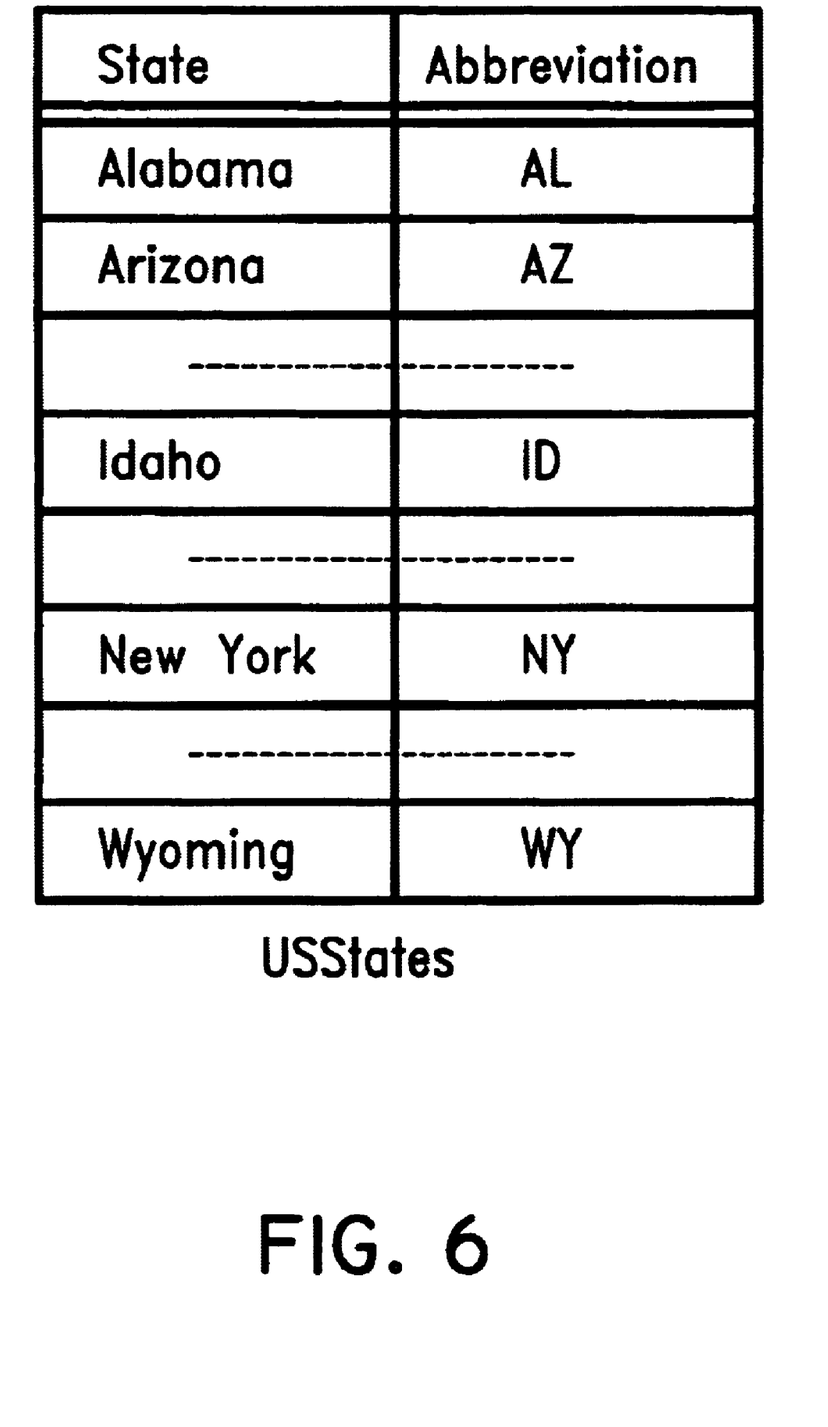
FIG. 6 is an illustrative abbreviation table for US States for use in accordance with the present invention.

A USStates table, as shown in FIG. 6, is used to expand the abbreviation of states such as "NY" to its full name "New York". For example, the abbreviation "NY" is entered by a user into the XML document, see numeral 105 in FIG. 1, a script code compares the abbreviation to an array (FIG. 6) and expands the abbreviation to full text, for example at numeral 460 of FIG. 4B.

Figure 5:
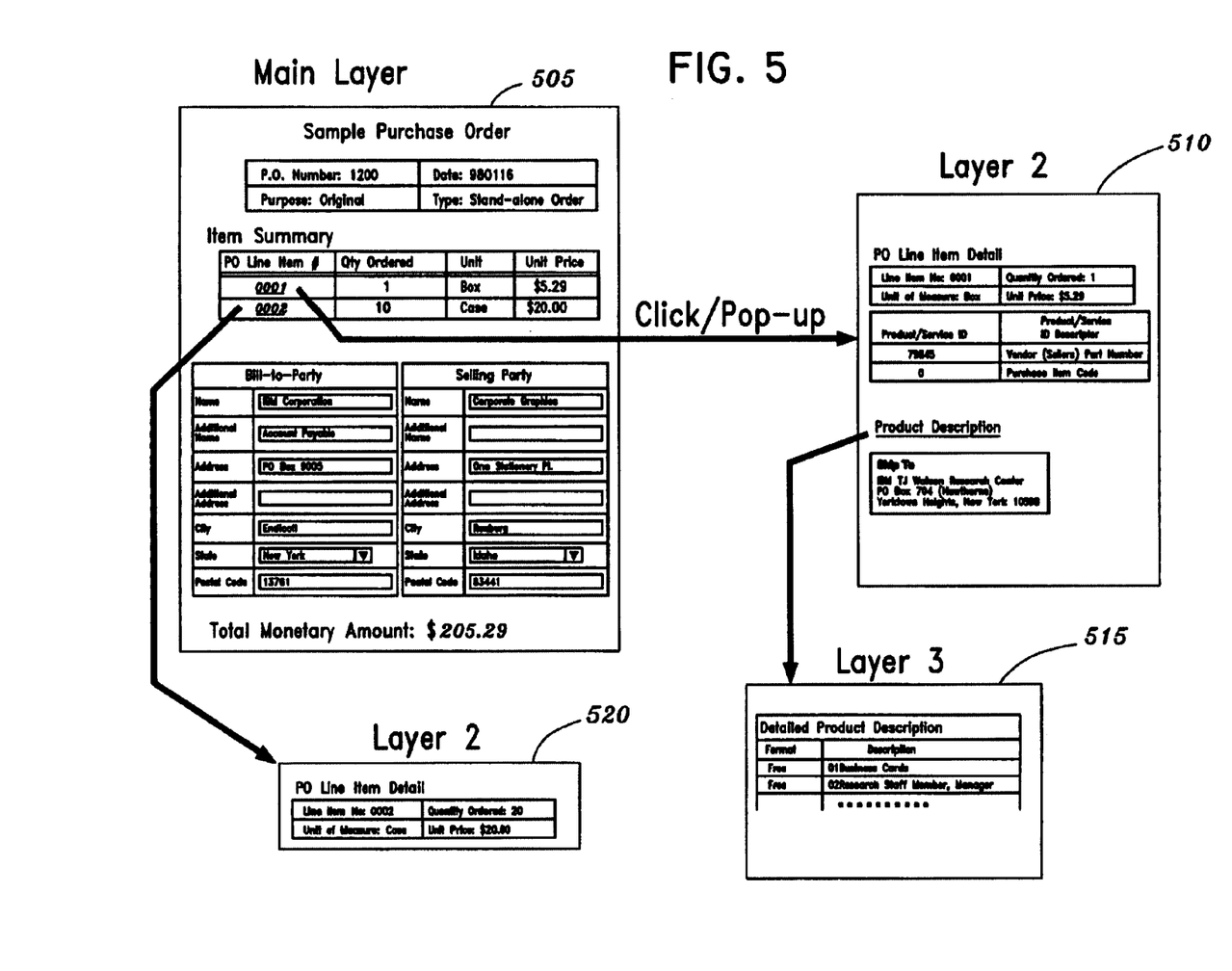
FIG. 5 is a schematic diagram of the windows/layers and operation sequences that may occur, for applying the display strategy illustrated in FIGS. 4A–4C to the XML document depicted in FIG. 1 in accordance with the present invention.

Referring to FIG. 5, possible windows and operation sequences that may occur for the style sheet of the present example are schematically shown. The line item with number 0001 can create one window 510 to explain the basic information about the item, which in turn can spawn the third window 515 for more detailed item description. The line item numbered 0002 can create a window 520. The style sheet should not generate the key text 450 (FIG. 4C) for spawning layer 3 if no ProductDescription data element is available for the current item, as in the XML document depicted in FIG. 1.

Figure 7A:
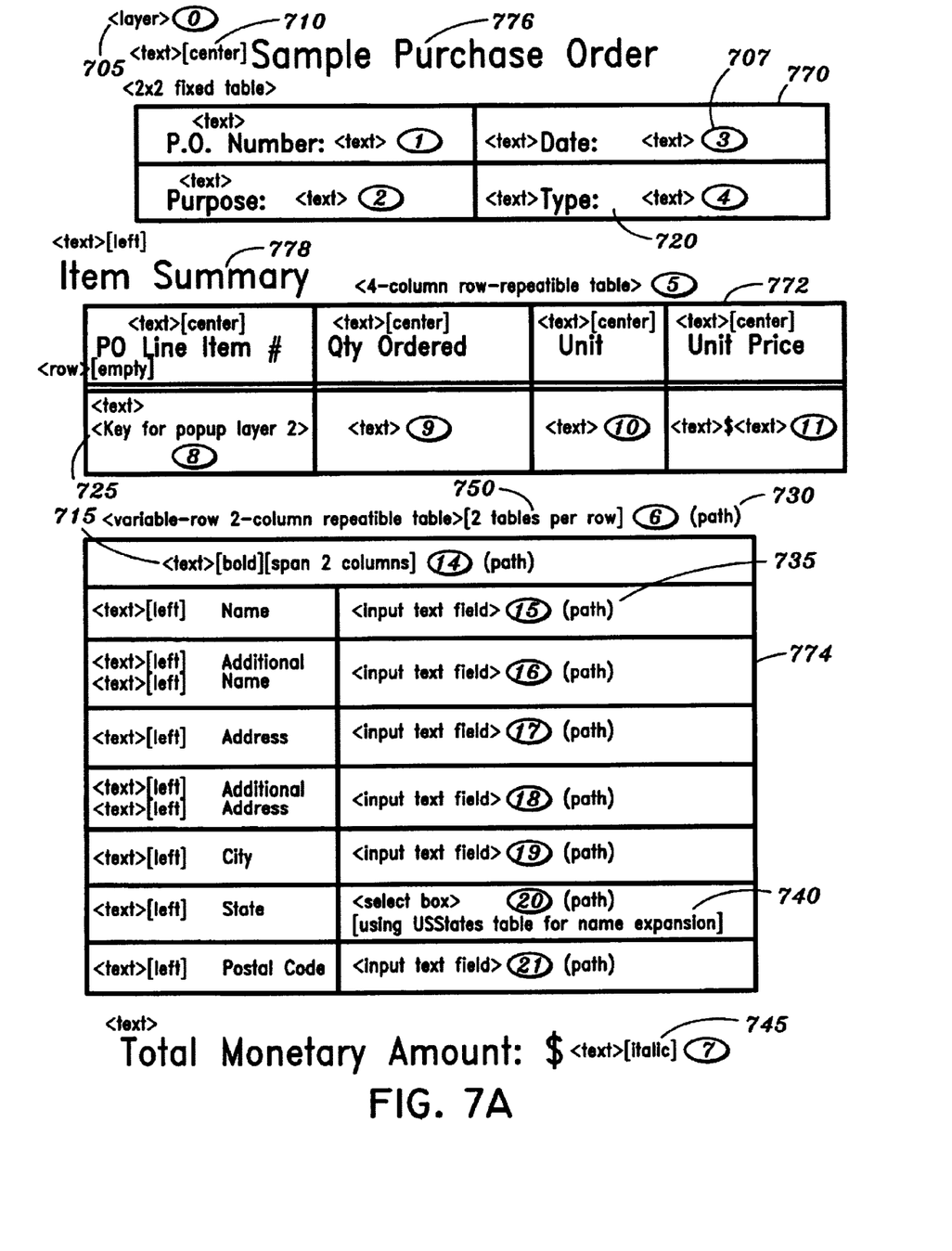
FIGS. 7A–7C depict the sample layouts that a graphical user interface can arrange according to user options in accordance with the present invention.
Figure 7B:
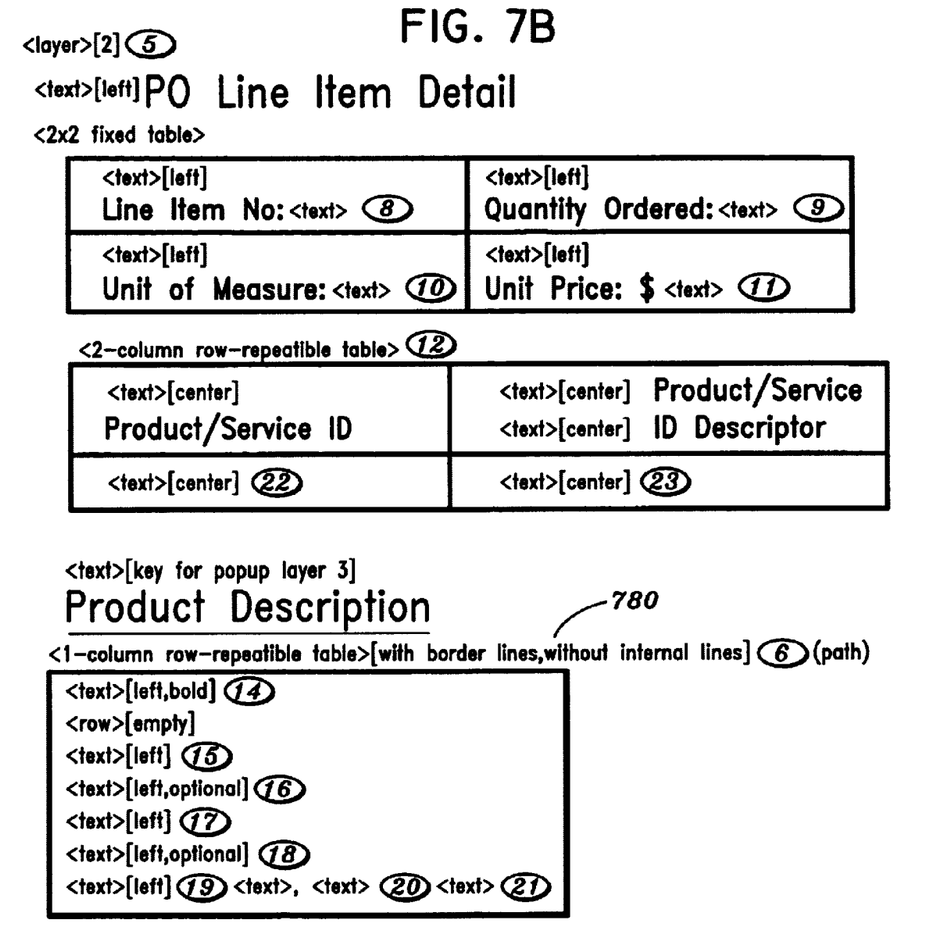
Figure 7C:
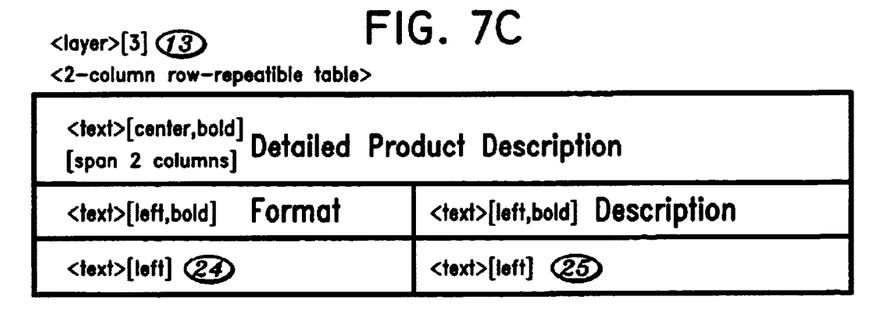

Referring to FIGS. 7A–7C, sample display templates or layouts are shown which are arranged according to user option of a GUI algorithm. The algorithm can generate a style sheet which renders any XML document that has the input structure DTD, e.g., the XML PO in FIG. 1 and the DTD in FIG. 2, to achieve the display effects as depicted in FIG. 5. FIGS. 7A–C show a nested container hierarchy that is enforced by the GUI process in accordance with the invention.

A user may create a main layer 705, and associate with it the node, PurchaseOrder 0 indicated by the oval with a zero in it, using drag-and-drop as shown by the oval-shaped nodes for the DTD graph shown in FIG. 3. Then the user may determine how to place the layer when its window is popped up, and assign the background color for the layer using CSS, for example. The user may create three table containers 770, 772, 774 within the main layer, with optional text containers 776, 778 as the table captions. Using drag-and-drop, the user associates a node with each table. The user may choose the displacement properties (e.g., 2 tables per row 750) and outlook (e.g., no internal lines 780 in FIG. 7B) for these tables. For dynamic tables, the user may issue "add a row" command to create a new row container. The user may create components within a column 720, 735, or spanning multiple columns 715. Text or data type components with keys can be used to pop up extra layers 725. The user may also have options to expand data type components with either user-defined or predefined name tag abbreviation tables 740. Sometimes there is a need to specify the exact path from the root node to the current node to uniquely identify the data type with multiple ancestors, e.g. Address 6.

The GUI provides the full path for a component 730 in addition to the drag-and-drop actions. The user may have options of choosing properties (e.g., italic font 745), and displacements (e.g., center 710).

Referring to FIG. 8, a sample style sheet is illustrated which may be generated for the display layout of the table 774 as illustratively depicted in FIG. 7A. The sample style sheet shows a way to render the table 415 as depicted in FIG. 4A using Javascript-like language. For simplicity, a "forall" 840 is employed to represent a "for" loop, which can be more involved in a Javascript language. The style sheet is hierarchically designed. The table container has a corresponding routine print_6( ), which prepares printing the table and individual rows with attributes 810, and calls several routines to print the children nodes, recursively. For example, print_14(n)820 basically returns a string that can display a text input field with a default value from the child node with tag name 830. The routine print_20(n) 870 returns a string representing a select component, and calls the routine expand_for_select ( ) 850 for string matching and expansion using the abbreviation table USStates 860. Using the expansion table name as a parameter advantageously permits implementing more complicated features.

To display name tag expansion as a default value in a regular text field or input text field, a matching algorithm is preferably implemented as a binary search routine to speed up the XML document rendering process. Such binary search routine and the expansion table internal representation as depicted in FIG. 6 can be coded in advance, and referred during script generation.

Figure 9:
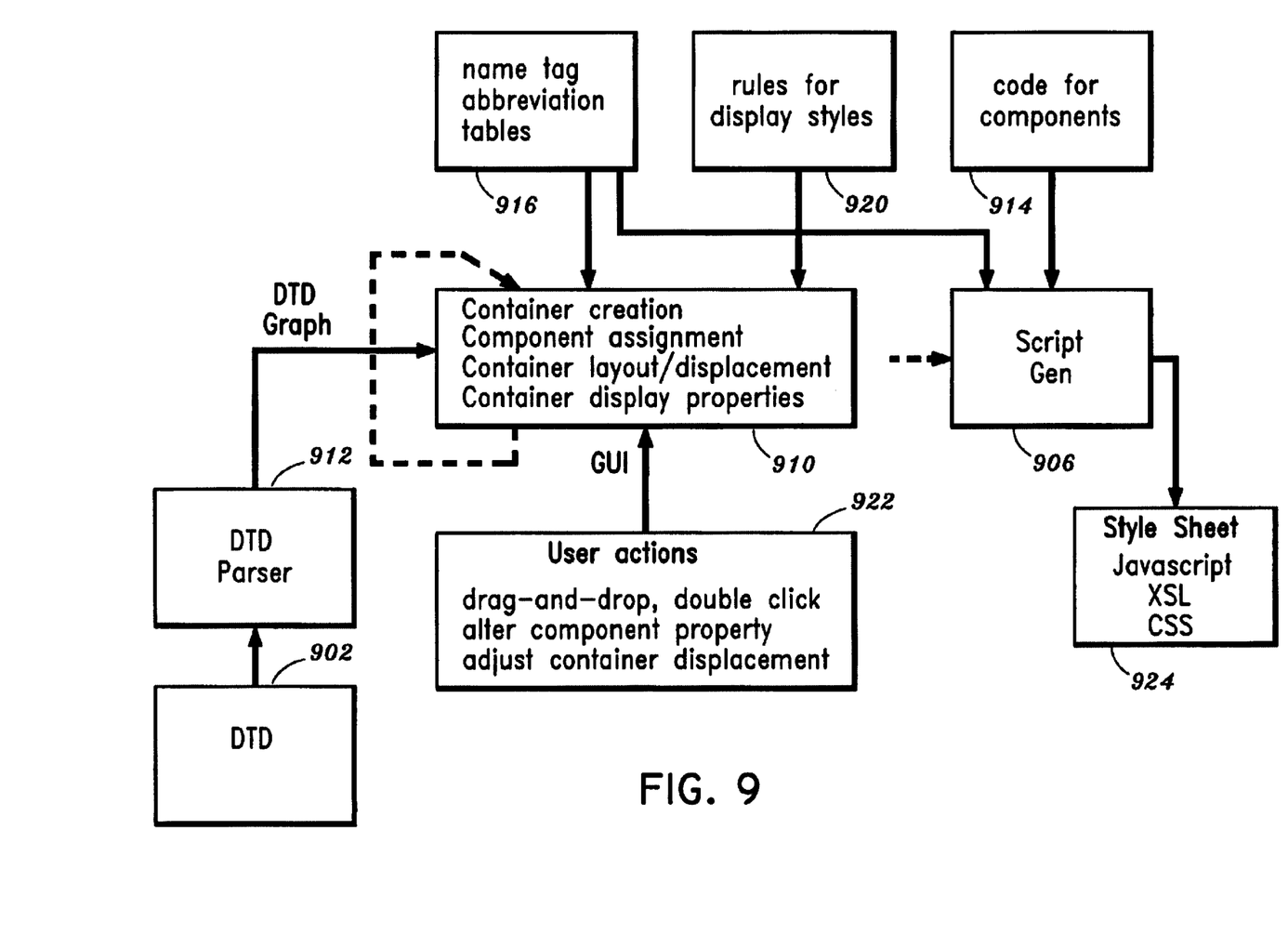
FIG. 9 is a flow/block diagram showing an automatic style sheet generation method/system in accordance with the present invention.
Figure 10:
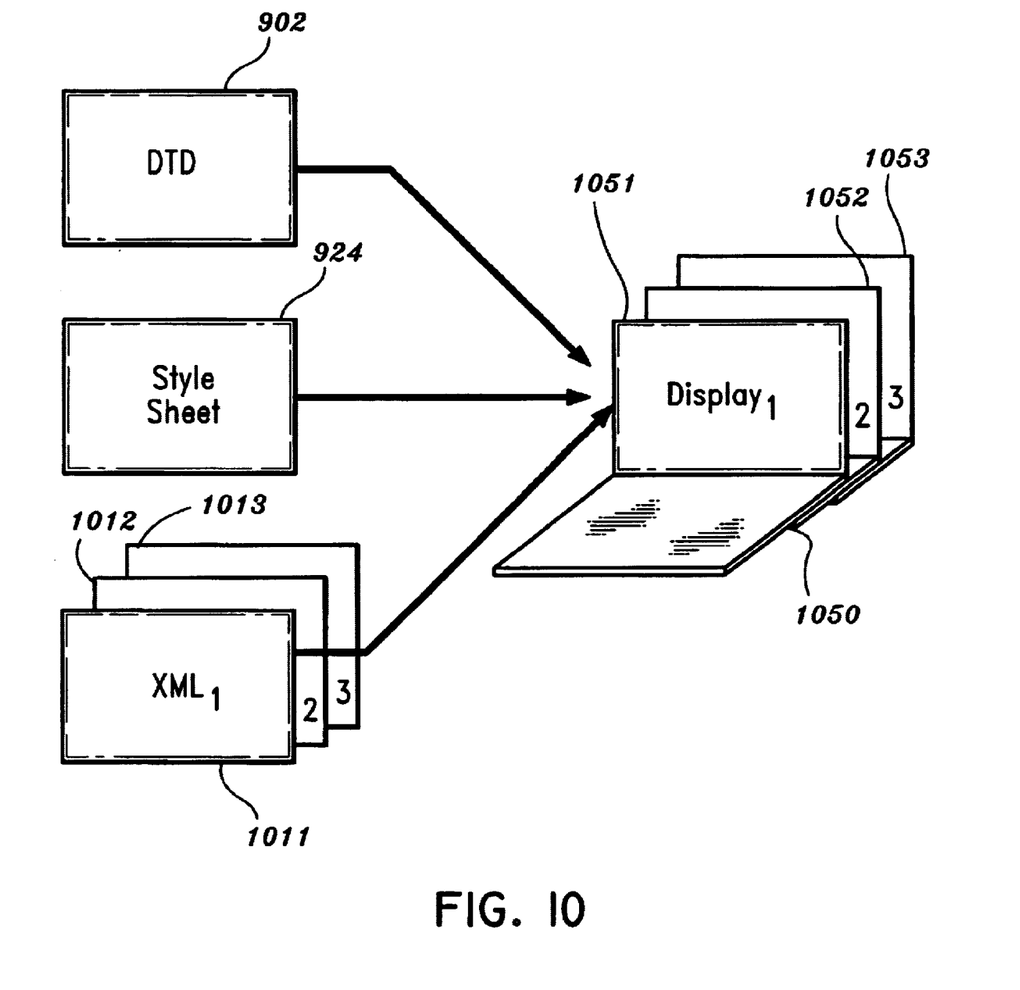
FIG. 10 is a block diagram showing a generated style sheet and input data type definition (DTD)for displaying XML documents conforming to the input DTD in accordance with the present invention.
Figure 11:
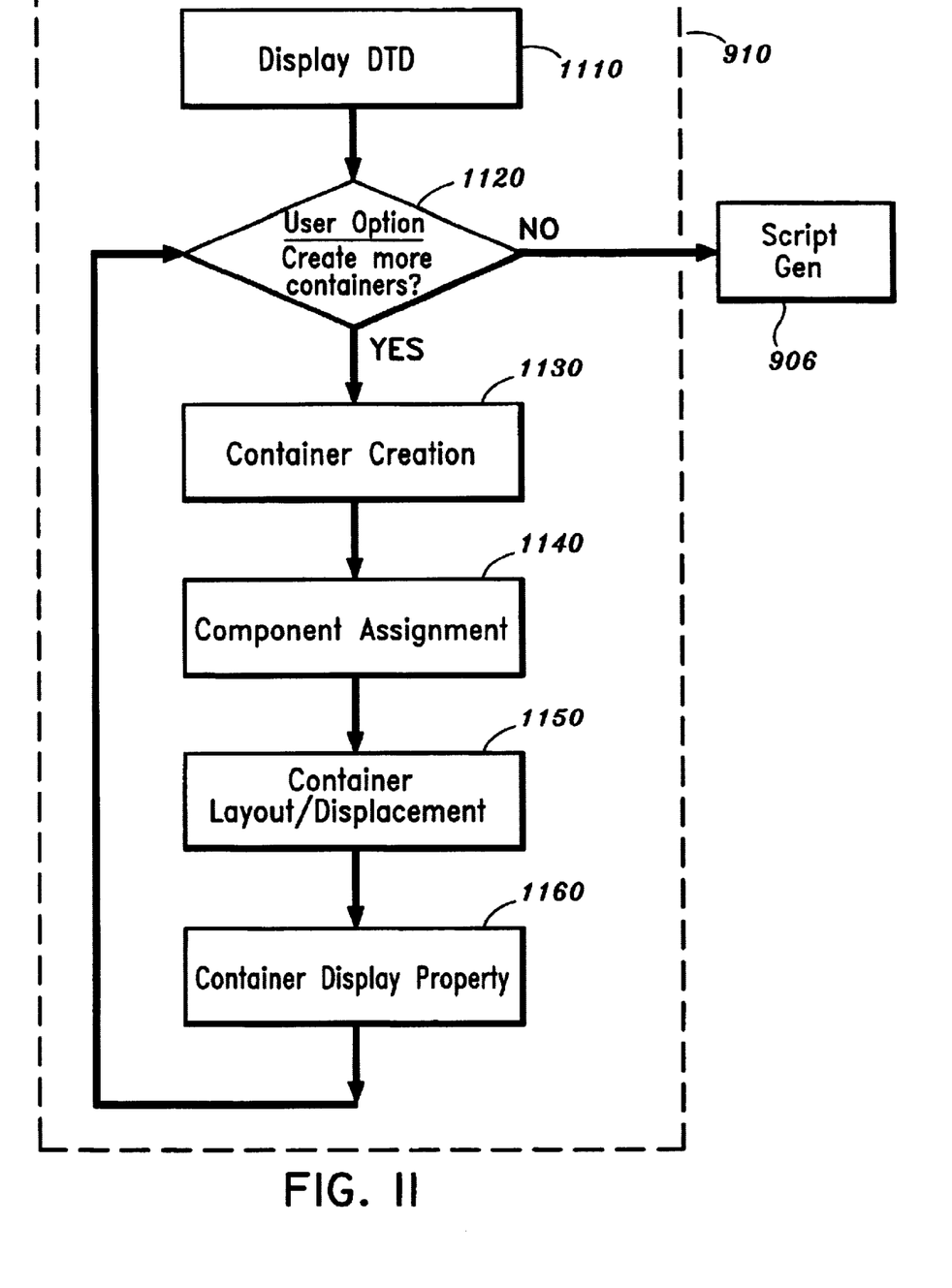
FIG. 11 is a flow/block diagram showing a graphical user interface method/system in accordance with the present invention.

It should be understood that the elements shown in FIGS. 9, 10 and 11 may be implemented in various forms of hardware, software or combinations thereof. Preferably, these elements are implemented in software on one or more appropriately programmed general purpose digital computers having a processor and memory and input/output interfaces. In preferred embodiments, input interfaces include a mouse and appropriate software to provide functions such as clicking on icons, drag and dropping, etc. Referring now to FIG. 9, an automatic style sheet generation system/method is shown. The dashed arrows represent the control flow, while solid arrows denote data flow and user interactions. A GUI tool 910 allows the users to create containers/components, to associate data types with specific containers/components using drag-and-drop or double click, to decide where and how to place the containers, and to assign properties to containers/components. Such procedure can be repeated to produce a hierarchical set of containers/components, until the users finish the design process. The script generation process, much like the code generation process in a compiler (parser), may then be invoked to produce the style sheet based on the user design.

A document structure(DTD), preferably written in XML, is provided in block 902. A document type graph in the form of a DTD graph is created by a parser 912. The nodes of the DTD graph may be manipulated to form a Web page display template, for example, which is used to generate the style sheet. In block 910, a Graphical User Interface (GUI tool) is used to assist web page layout and table arrangement. Similar to a code generation phase in a compiler, partial script or a style sheet is generated corresponding to a specific layout selection in block 906. The invention includes style sheet generation as output in block 924 by performing several tasks, for example: (1) utilize a parser 912 for generating a Data Type Definition (DTD) graph, (2) prepare style sheet commands or code for a code generation process, to create individual components, to generate specific styles, and to invoke certain functions in blocks 914, (3) define customized abbreviation tables, and methods to access well-known pre-defined abbreviation tables in block 916, (4) specify allowable rules for component creation procedures/restrictions and displacement/outlook/format design, in block 920 and (5) arrange GUI tool 910 for examining/manipulating the DTD graph, enforcing the allowable rules, and invoking the code generation process to produce the style sheets.

DTD parser 912 generates and displays a graph, which is useful to the GUI tool 910 for providing user-friendly features such as drag-and-dropping a node of the DTD graph to a table entry, and double-clicking on a node for selecting options in block 922. Common components and display styles may be treated as objects and properties. Style sheet commands to achieve specific display effects, to invoke certain mathematics functions, and to establish relations between components (e.g., for passing parameters between layers) may be coded separately in advance under different style sheet scripts in block 914. In block 916, the XML documents may include abbreviations for certain data types (e.g., in US states, "NY" stands for "New York"). Allowing the usage of abbreviation tables can save the document size considerably, providing that such tables are common and easily accessible.

Efficient style sheet commands implementing binary search for table matching and data expansion may improve the display speed when XML documents are rendered to browsers using the style sheets. Simple rules governing the precedence relations or ordering among components may be enforced to ensure logical user-friendly operation sequences, and to perform basic syntax/semantics checking. For example, a style sheet designer may issue an "add one row" command only when a specific container (a table in this case) exists. Also when creating a new layer for grouping/hiding certain data types, only syntactically/semantically related types may be assigned to the same layer.

The basic rules for style sheet design include the following steps: (a) container creation (layouts, tables, rows etc.), (b) component assignment (using drag-and-drop, option selection, or text input), (c) container layout and displacement for layers, frames, tables, texts and data types, (d) component display properties (fonts, text/input fields, select options etc.). The above steps can be repeatedly applied to create a nested container hierarchy such as a table inside a layer, a row in a table, an entry in a row, a text field and a drag-and-drop data type in an entry.

GUI tool 910 connects all the other tasks together, and bridges between the end users and the style sheets. By serving as a front-end, the tool provides many user-friendly features such as drag-and-drop, options listing, data field editing, and layer semantics checking. The tool also invokes an automatic code generation process so that the entire style sheet design/generation procedure and the style sheet itself can be transparent to the users.

Referring to FIG. 10, a generated style sheet 924 and a DTD 902 are used to render three XML documents 1011, 1012, 1013 into three different displays 1051, 1052 and 1053 which conform to the provided DTD 902 structure.

Referring to FIG. 11, a GUI tool 910 accepts user input, generates a display template and passes the display template to a script generation process in block 906 for automatically generating a style sheet. GUI tool 910 may implement the following algorithm. In block 1110, a DTD graph is displayed, with markers on loop header nodes ('*') and optional nodes ('?'). In a block 1120, the user may choose to create a container. If no more containers are to be created, the algorithm enters the script generation process in block 906 for producing the style sheet. Otherwise, the algorithm performs the steps in blocks 1130, 1140, 1150 and 1160 until there are no more containers to be created. In block 1130, the user may select the type of container(s) to create. New containers may include a pop-up window or frame, a new table (fixed or dynamic), a compound element and/or a static element. A static element is an element without sub-containers. A compound element may include text fields and a combination of other container types, and may form a hierarchical layout. A dynamic table is a special container with extensible rows and columns. The number of actual occurrence of a repeatable item is unknown at style sheet design time. With extensible rows and columns, the CUI tool can show one row or column, and the table can be expanded during document rendering time to achieve the correct size.

In block 1140, for each container created, the user may drag-and-drop a node of the displayed DTD graph, say node R, to associate with the container, such that only nodes on the sub-graph rooted at R and nodes semantically related to R may appear in the current container. For static elements, the user can only drag-and-drop those nodes which are semantically unique under the container to be created. For specific data types, options are provided to view/display all the valid values, in both shorthand notations and full descriptions. The abbreviation table repositories on the server site or local desk may need to be retrieved, and a list of abbreviation tables may be provided. Modification may be made after selecting the abbreviation table.

In block 1150, options are provided for the user to arrange the container layout and displacement. For example, although the number of repeatable items, e.g., tables and static data, is unknown at this time, the user can choose to preset the dimensions, for example the number of rows or columns. The user may also adjust the relative location of a text element inside a compound container. Other options may be provided as well. In block 1160, options are provided for the user to select the features of the container, e.g., the background color, font type, font size, text color, etc.

Having described preferred embodiments for automatic display script and style sheet generation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for automatically generating a style sheet comprising:
   a parser for generating a document type graph in accordance with an input structure;
   a graphical user interface tool for interactively mapping the document type graph to form a display template in accordance with user requirements; and
   a script generator for generating the style sheet in accordance with the graphical user interface and display template.

2. The system as recited in claim 1 wherein the input structure is a data type definition (DTD) written in extensible markup and language (XML).

3. The system as recited in claim 1 wherein the parser is a data type definition parser and the document type graph includes a data type definition (DTD) graph.

4. The system as recited in claim 1 wherein the document type graph includes nodes representing data types.

5. The system as recited in claim 4 wherein the nodes are capable of being manipulated such that the data type represented by the node is represented at a location to which the node is manipulated.

6. The system as recited in claim 4 wherein the nodes are capable of having their properties altered by graphically activating the nodes of the graph.

7. The system as recited in claim 1 further comprises abbreviation tables for converting abbreviations of the document type graph to full text to be displayed.

8. The system as recited in claim 1 further comprises pop-up windows and layers provided by activating predetermined portions of the style sheet.

9. The system as recited in claim 1 further comprises dynamic tables having dimensions determined upon rendering the style sheet.

* * * * *